(12) United States Patent
Park et al.

(10) Patent No.: US 7,026,740 B2
(45) Date of Patent: Apr. 11, 2006

(54) MOTOR STATOR ASSEMBLY AND FABRICATION METHOD THEREOF

(75) Inventors: Jin-Soo Park, Incheon (KR); Byung-Taek Kim, Ansan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/617,736

(22) Filed: Jul. 14, 2003

(65) Prior Publication Data
US 2004/0169433 A1    Sep. 2, 2004

(30) Foreign Application Priority Data
Feb. 27, 2003    (KR) .................... 10-2003-0012461

(51) Int. Cl.
*H02K 1/00*    (2006.01)

(52) U.S. Cl. ...................................... 310/216; 310/254

(58) Field of Classification Search ................ 310/216, 310/217, 218, 179, 254, 43
See application file for complete search history.

(56) References Cited

U.S. PATENT DOCUMENTS

| | | | | |
|---|---|---|---|---|
| 3,866,071 A * | 2/1975 | Hallerback | .................... | 310/43 |
| 5,955,814 A * | 9/1999 | Fujiwara | ..................... | 310/258 |
| 6,034,461 A * | 3/2000 | Sun | ............................ | 310/218 |
| 6,411,006 B1 * | 6/2002 | Suzuki et al. | ............... | 310/254 |
| 6,472,792 B1 * | 10/2002 | Jack et al. | .................. | 310/254 |

* cited by examiner

*Primary Examiner*—Darren Schuberg
*Assistant Examiner*—Nguyen N. Hanh
(74) *Attorney, Agent, or Firm*—Greenblum & Bernstein, P.L.C.

(57) ABSTRACT

Disclosed is a motor stator assembly comprising: a plurality of yokes manufactured by laminating a plurality of steel sheets having a predetermined length; and a plurality of poles engaged between the yokes and formed by molding magnetic material in a mold, on which coil is wound. In the assembly, material loss can be reduced at the time of blanking operation, and additional protector is not required. According to this, a winding radius of coil is reduced thus to reduce coil amount on the basis of a constant number of times of winding. Also, by using magnetic powder material and silicon steel, productivity is enhanced and motor efficiency is enhanced.

14 Claims, 10 Drawing Sheets

MOTOR STATOR ASSEMBLY AND FABRICATION METHOD THEREOF

BACKGROUND OF THE INVENTION

1. Field of the Invention

The present invention relates to a stator of a motor, and more particularly, to a motor stator assembly and a fabrication method thereof for fabricating a yoke by laminating a plurality of steel sheets and fabricating a pole by a powder metallurgy method.

2. Description of the Related Art

Generally, most of electric appliances use a motor as a driving source. The motor comprises a stator assembly for winding and fixing coil, and a mover assembly positioned inside or outside of the stator assembly and rotated by induction magnetic field for transmitting a driving force.

FIG. 1 is a perspective view showing a stator assembly manufactured by a lamination method in accordance with the conventional art.

As shown, the stator assembly comprises: a stator core 1 formed by laminating a plurality of sheets C which are fabricated by blanking steel with a predetermined shape; an insulator 2 installed in the stator core 1; and a coil 3 wound outside of the insulator 2 for forming induction current.

As shown in FIG. 2, the sheets C constituting the stator core 1 includes a yoke 1a formed as a quadrangle shape for forming a magnetic path; and a pole 1b formed integrally with the yoke 1a as a circular arc shape at both sides of an inner circumference surface of the yoke 1a, on which the coil 3 is wound.

The insulator 2 is attached to a part where the yoke 1a and the pole 1b are connected to each other, and is formed with insulating material such as plastic or rubber for insulating between the coil 3 and the stator core 1.

However, in the stator assembly of a lamination method, an amount of scrap loss which is discarded at the time of blanking for fabricating the stator core is more than 35%, and accordingly, loss of material is generated.

Also, since a protector manufactured by injection molding, is inserted between the stator core and the coil, a radius of a part where coil is wound increases, which result in cost rise, a winding resistance is increased, and thus a motor efficiency is decreased.

To solve the above problems, as shown in FIGS. 3 and 4, the stator assembly of powder metallurgy method comprises: a frame 5 formed by inputting magnetic powder material into a mold of a predetermined shape, applying a predetermined pressure, and heating with a predetermined temperature; and a coil 6 wound on a winding groove 5c of the frame 5 for generating induction magnetism.

The frame 5 includes a yoke 5a formed as a closed curve of a quadrangle shape for forming a magnetic path; and a pole 5b formed integrally with the yoke 5a as a circular arc shape at both sides of an inner circumference surface of the yoke 5a.

A neck portion of the winding groove 5c is provided in order to reduce an amount of the coil 6, and an edge of the winding groove 5c is formed as a curved line in order to prevent coating of the coil 6 from falling off when the coil 6 is wound.

Also, an insulator 7 for insulating the coil 6 from the pole 5b is attached to an outer side of the pole 5b and the winding groove 5c and an inner side of the yoke 5a which are contacted with the coil 6.

However, the powder metallurgy method has a disadvantage that a magnetic permeability of magnetic powder and core loss characteristic are lower than silicon steel used in the lamination method and material cost is expensive.

Herein, the magnetic permeability is called as magnetic inductive capacity, which means a ratio between magnetic flux density generated at the time of magnetization by magnetic field and intensity of the magnetic field in a vacuum state.

Also, the core loss characteristic means loss generated by steel in a unit volume, and silicon steel has more excellent core loss characteristic than iron powder. That is, since the silicon steel has more excellent magnetic flux density than the iron powder, the motor efficiency is relatively better.

In the powder metallurgy method, the frame is formed by using the mold thus to have an easy fabricating process, the winding groove is formed at the neck portion of the pole thus to reduce consumption amount of the coil, and the curved line is formed at the winding groove thus to prevent the coil from falling off at the time of being wound. However, cost of the magnetic powder is considerably expensive than the silicon steel.

Also, since the magnetic powder has low permeability and the core loss characteristic than the silicon steel, a frame of a larger volume is required in order to obtain the same effect with a motor using the conventional silicon steel, thereby increasing material cost.

SUMMARY OF THE INVENTION

Therefore, an object of the present invention is to provide a motor stator assembly and a fabrication method thereof for fabricating a yoke by laminating a plurality of steel sheets and fabricating a pole by a powder metallurgy method, thereby reducing a fabricating cost and enhancing a motor performance.

To achieve these and other advantages and in accordance with the purpose of the present invention, as embodied and broadly described herein, there is provided a motor stator assembly comprising: a plurality of yokes fabricated by laminating a plurality of steel sheets having a predetermined length; and a plurality of poles engaged between the yokes and formed by molding magnetic material in a mold, on which coil is wound.

Also, the pole includes: a guide part having a circular arc shape and for collecting magnetic flux; a winding part connected to a rear surface of the guide part, on which coil is wound; and a connecting part formed at a rear surface of the winding part and connected to the yoke.

To achieve these and other advantages and in accordance with the purpose of the present invention, as embodied and broadly described herein, there is also provided a manufacturing method of a motor stator assembly comprising the steps of: a first step of forming a plurality of yoke plates by blanking steel plate of a predetermined shape; a second step of forming a yoke by laminating the yoke plates with a predetermined height; a third step of forming a predetermined frame by installing the laminated yoke into a mold; a fourth step of filling magnetic powder material in an empty space of the mold; a fifth step of forming a pole engaged to the yoke by applying a predetermined pressure and heat to the filled magnetic powder material; and a sixth step of removing the mold and then winding coil to the pole.

In the first step, the yoke plates are formed by blanking the steel plate having a predetermined length and a width at a time.

In the fifth step, the pole is formed in accordance with that the magnetic powder material is pressed and then cured with 300~500° C. thus to be combined one another.

In the sixth step, when the coil is wound on the pole, an insulator is attached to a contacted part between the pole and the coil, or insulating material is molded and attached thus to wind the coil.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A motor stator assembly and a fabrication method thereof according to the present invention will be explained with reference to the most preferred embodiment.

Figure 1:
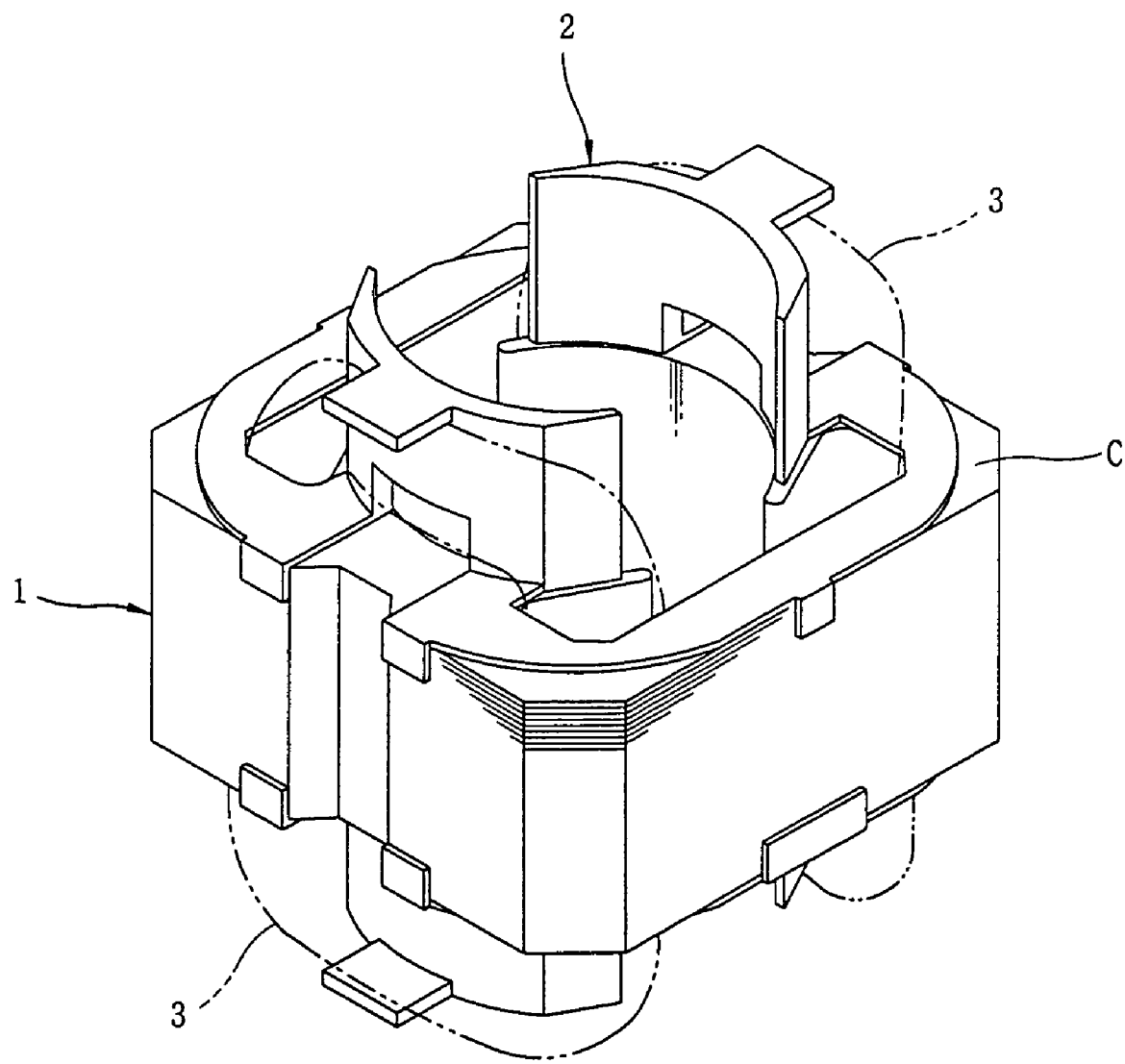
FIG. 1 is a perspective view showing a motor stator assembly of a lamination method in accordance with the conventional art.
Figure 2:
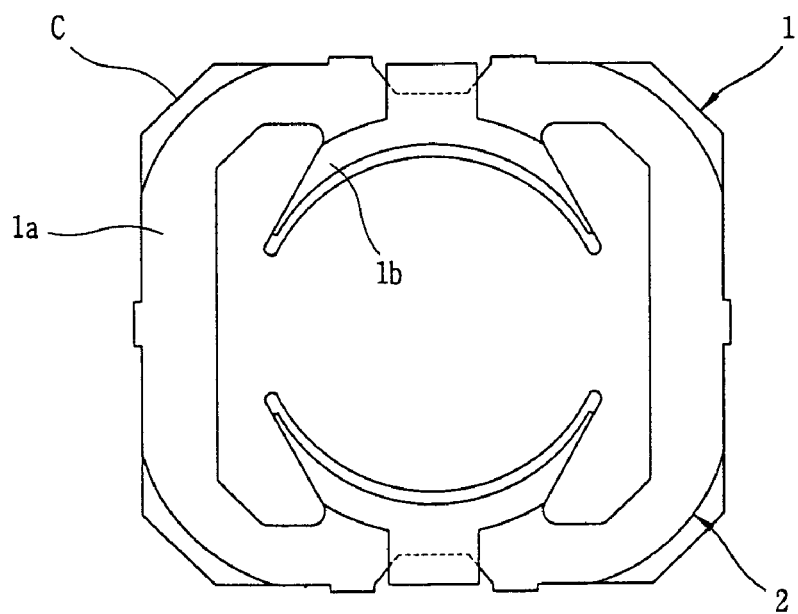
FIG. 2 is a plan view showing the stator assembly of a lamination method in accordance with the conventional art.
Figure 3:
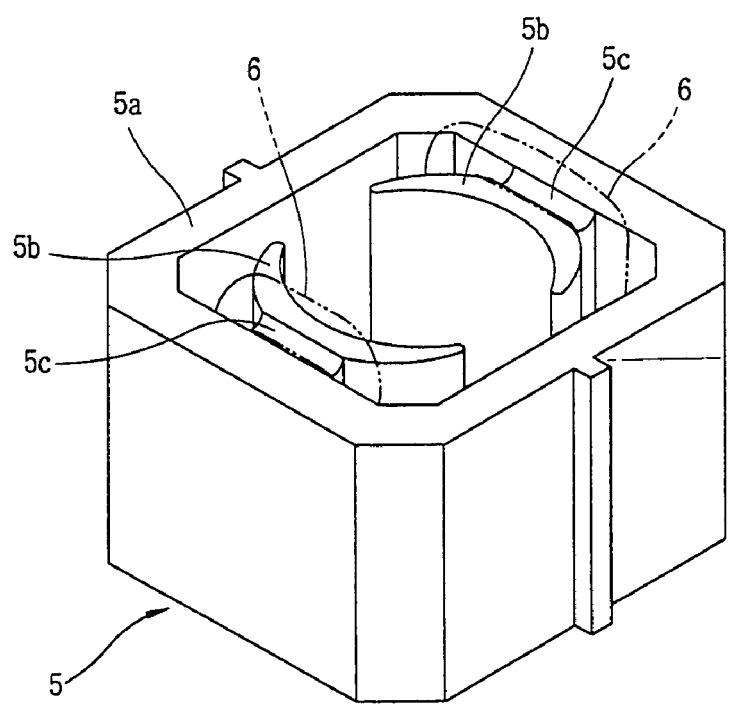
FIG. 3 is a perspective view showing a motor stator assembly of a powder metallurgy method in accordance with the conventional art.
Figure 4:
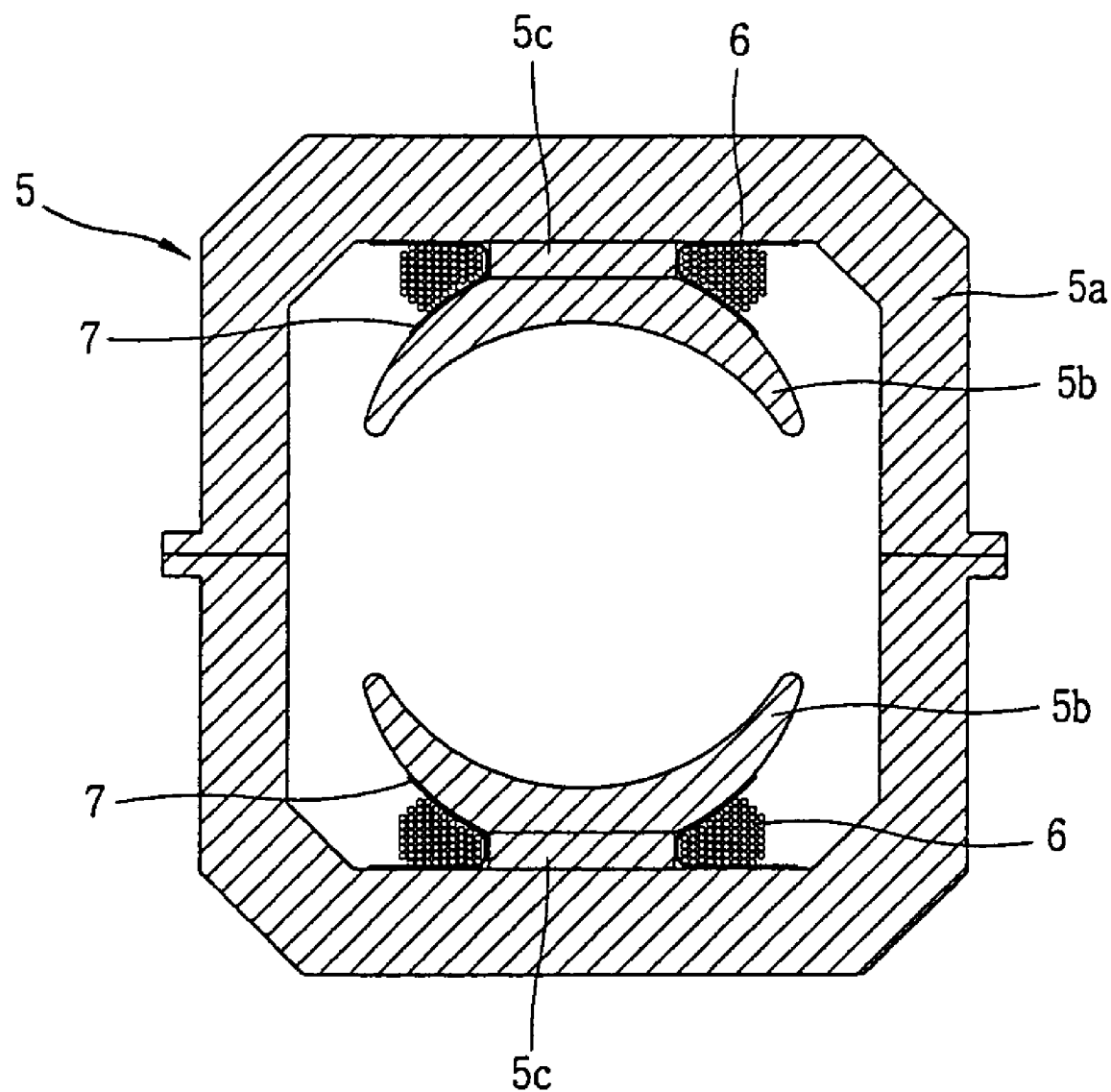
FIG. 4 is a sectional view showing the motor stator assembly of a powder metallurgy method in accordance with the conventional art.
Figure 5:
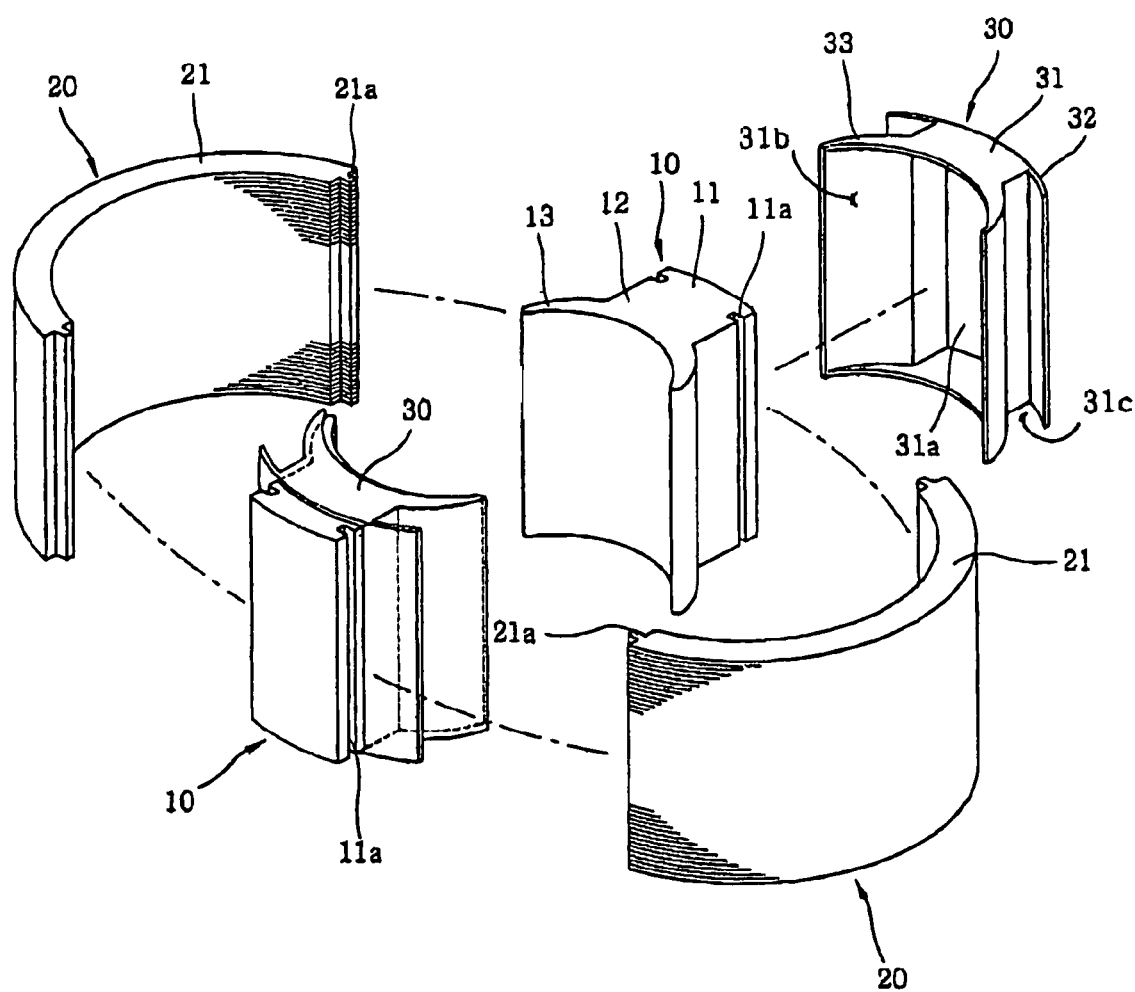
FIG. 5 is a disassembled perspective view of a motor assembly stator according to the present invention.
Figure 6:
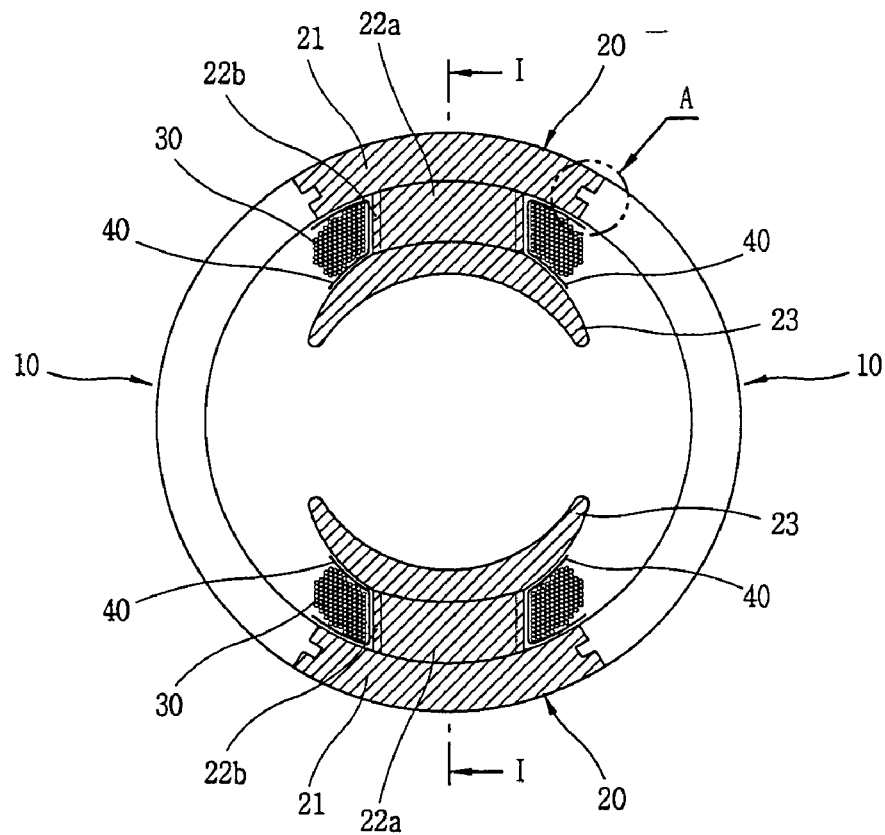
FIG. 6 is a sectional view of the motor assembly stator according to the to present invention.
Figure 12:
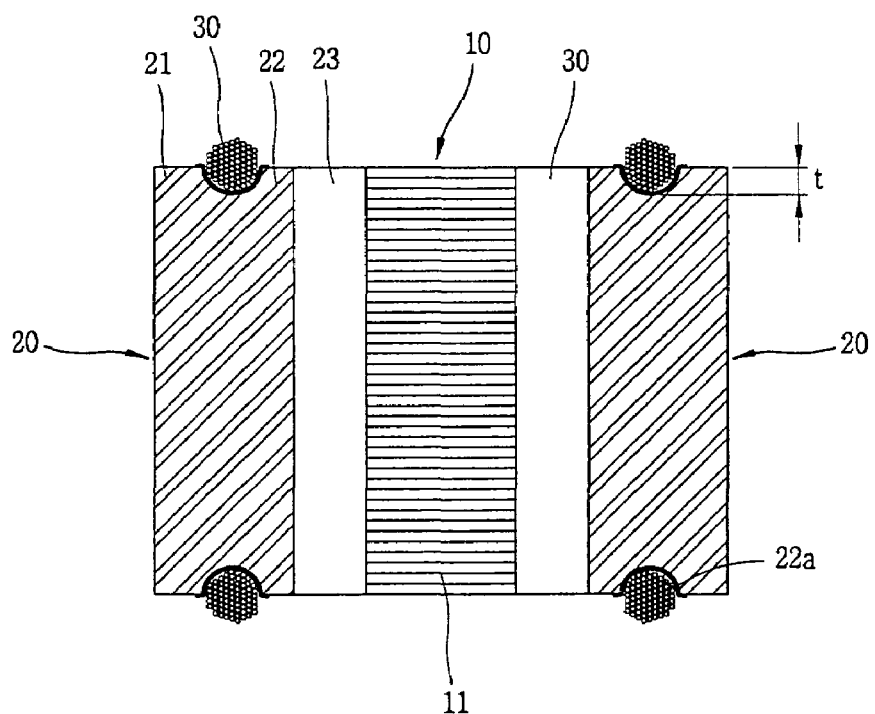
FIG. 12 is a sectional view taken along line I—I of FIG. 6.
Figure 13:
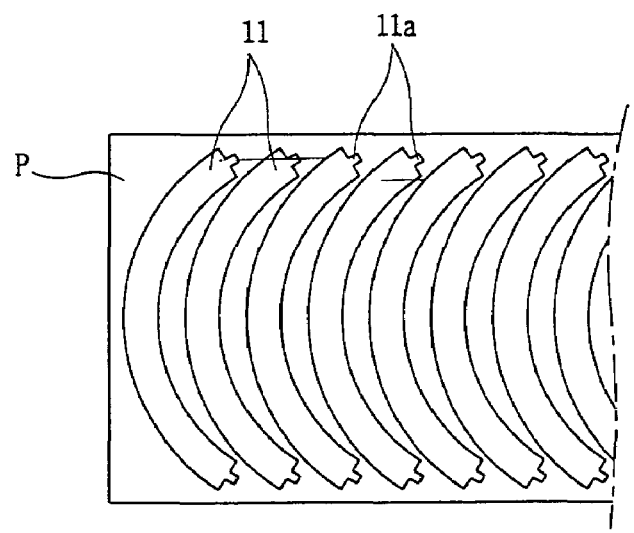
FIG. 13 is an upper surface view of a steel plate showing a manufacturing method of a yoke according to the present invention.
Figure 14A:
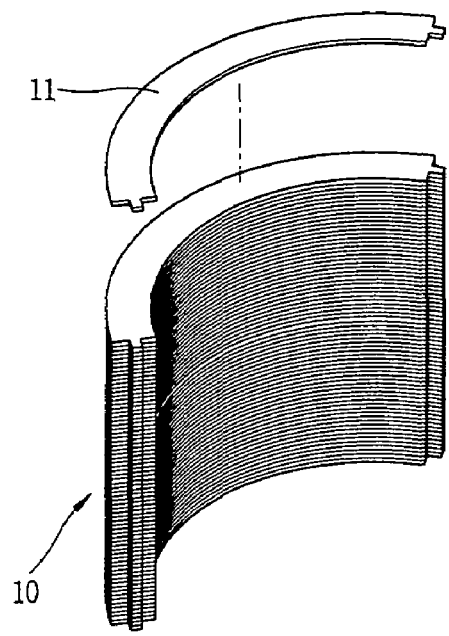
FIGS. 14A to 14D are views showing manufacturing processes of the motor stator assembly according to the present invention.
Figure 14B:
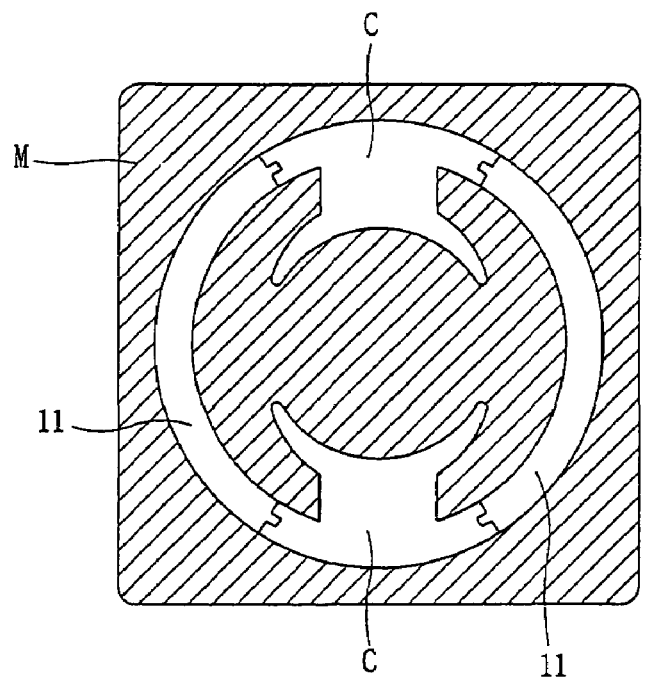
Figure 14C:
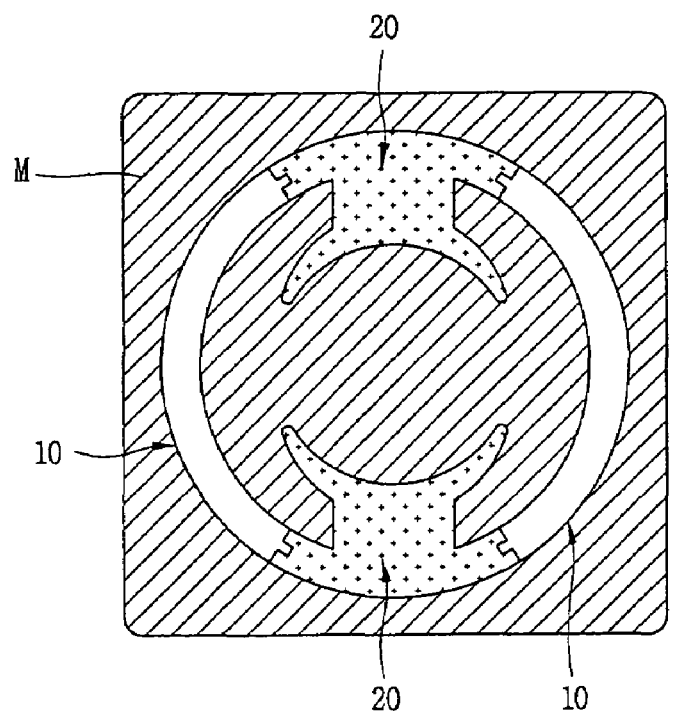
Figure 14D:
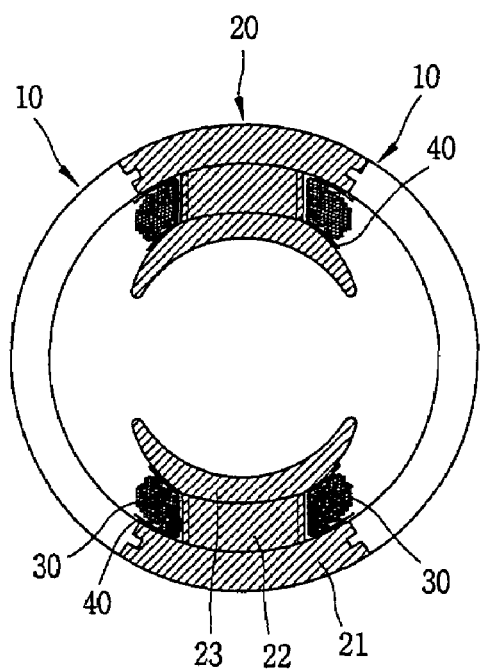

FIG. 5 is a disassembled perspective view of a motor assembly stator according to the present invention; FIG. 6 is a sectional view of the motor assembly stator according to the present invention; FIGS. 7 to 11 are enlarged views of "A" part of FIG. 6 showing an engagement structure between a connecting part and a yoke of the stator assembly according to the present invention; FIG. 12 is a sectional view taken along line I—I of FIG. 6; FIG. 13 is an upper surface view of a steel plate showing a fabrication method of a yoke according to the present invention; and FIGS. 14A to 14D are views showing fabricating processes of the motor stator assembly according to the present invention.

As shown in FIG. 5, the motor stator assembly according to the present invention comprises: a plurality of yokes 10 manufactured by laminating a plurality of steel sheets having a predetermined length; and a plurality of poles 20 engaged between the yokes 10 and formed by molding magnetic material in a mold, on which coil is wound.

The pole 20 includes a guide part 23 having an inner surface of a circular arc shape and for collecting magnetic flux. The guide part 23 is provided to form a magnetic path with a predetermined distance with a rotor inserted at an inner side of the stator.

A winding part 22 is formed at a rear surface of the guide part 23 by being integrally connected, and coil is wound on the winding part 22.

A height and a length of the winding part 22 are smaller than those of the guide part 23, which prevents the coil 30 from being protruded out of the guide part 23 when the coil 30 is wound on the winding part 22 and so as to wound the coil 30 several times.

Also, a coil groove 22a having a thickness t is preferably formed at an outer circumference surface of the winding part 22 so that the coil can be wound thereon.

A curved line part 22b is preferably formed at an edge of the outer circumference surface of the winding part 22 in order to prevent coating of the coil from falling off at the time when the coil is wound.

A connecting part 21 connected to the yoke 10 is integrally formed at a rear surface of the winding part 22.

The connecting part 21 has a circular arc shape and the same height with the yoke 10.

The pole 20 is formed with magnetic powder material for polarity. At this time, a curing process is performed, that is, the powder material is putted into a mold, pressed, and heated with 300~500° C., thereby being engaged to one another.

Herein, the number of the poles 20 fabricated by forming the magnetic powder material can be plural, and according to this, the number of the yokes 10 can be plural.

As shown in FIGS. 5 and 6, an insulator 40 for insulating the pole 20 from the coil 30 is attached to at inner sides of the winding part 22 on which the coil 30 is wound and the pole 20, or nonconductive material is molded. And the nonconductive material includes epoxy.

The plurality of yoke plates 11 having a constant curvature radius therein are laminated as a height of the connecting part 21, and the yokes are engaged between two connecting parts 21.

The yoke plates 11 are formed of silicon steel having excellent permeability and core loss characteristic.

Herein, the magnetic permeability is called as magnetic inductive capacity, which means a ratio between magnetic flux density generated at the time of magnetization by magnetic field and intensity of the magnetic field in a vacuum state.

Also, the core loss characteristic means loss generated by steel in a unit volume, and silicon steel has more excellent core loss characteristic than iron powder. That is, since the silicon steel has more excellent magnetic flux density than the iron powder, a motor efficiency is relatively high.

A connecting projection 11a and a connecting groove 21a for engaging the yoke 10 to the connecting part are formed between the yoke 10 and the connecting part 21 with the same height as the yoke 10 and the connecting part 21.

Figure 7:
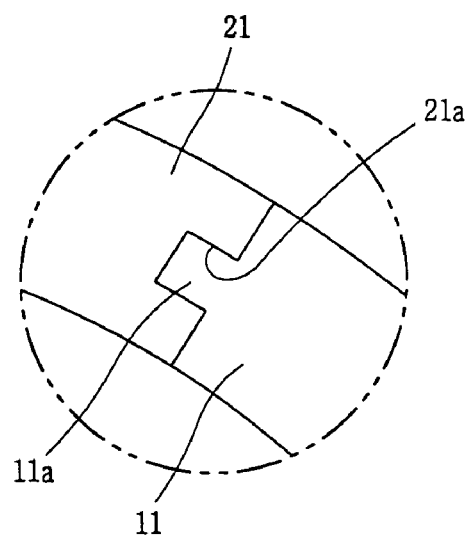
FIGS. 7 to 11 are enlarged views of "A" part of FIG. 6 showing an engagement structure between a connecting part and a yoke of the stator assembly according to the present invention.

As shown in FIG. 7, the connecting projection 11a of the yoke 10 is protruded as a rectangular shape, and engaged to the connecting groove 21a having a rectangular groove of the connecting part 21 in order to prevent the yoke 10 from being separated from the connecting part 21.

Figure 8:
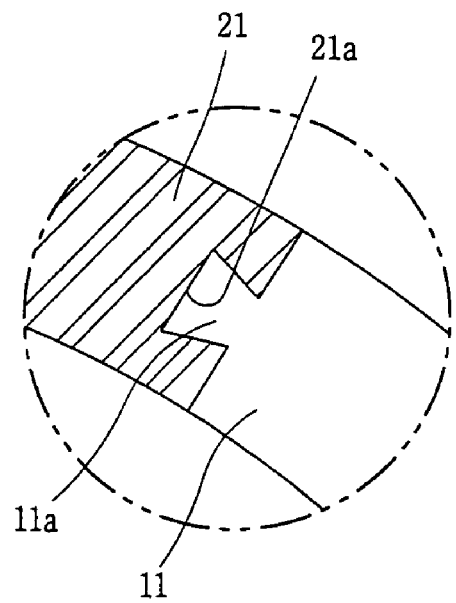

As shown in FIG. 8, the connecting projection 11*a* of the yoke 10 is protruded as a trapezoid shape, and engaged to the connecting groove 21*a* having a corresponding trapezoid groove of the connecting part 21.

Figure 9:
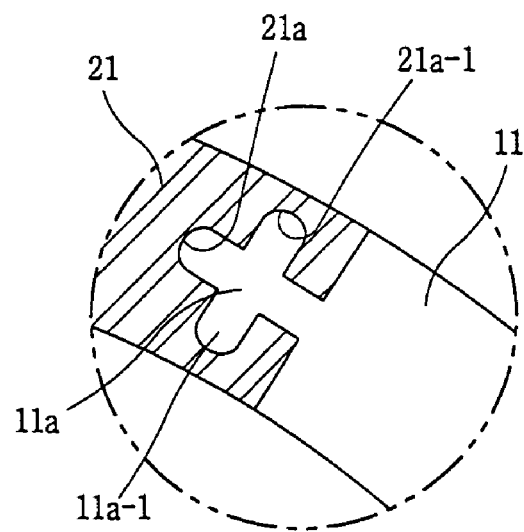

As shown in FIG. 9, the connecting projection 11*a* of the yoke 10 is protruded long with two same stopping jaws 11*a*-1 at both sides thereof, and engaged to the stopping groove 21*a*-1 having a groove of a corresponding shape to the connecting part 21 in order to prevent the yoke 10 from being separated from the connecting part 21.

Figure 10:
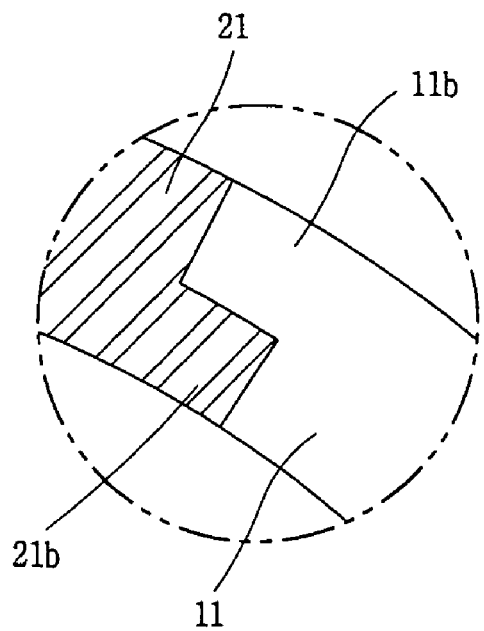

As shown in FIG. 10, a step projection 11*b* of a rectangular shape is formed at both ends of the yoke 10 and engaged to a step projection 21*b* formed at both ends of the connecting part 21 with a corresponding rectangular shape.

Figure 11:
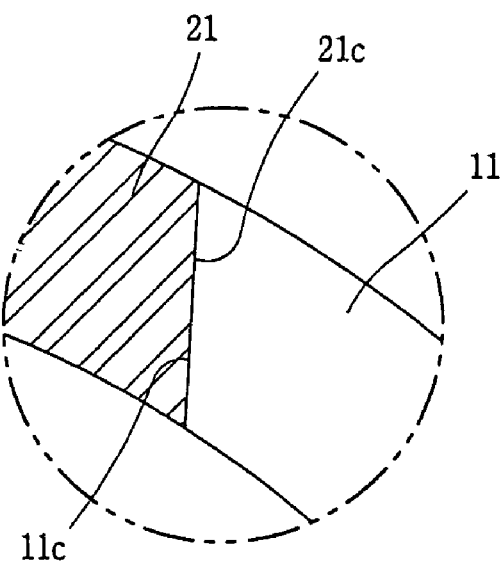

As shown in FIG. 11, the yoke 10 has a constant inclined surface 11*c* at both ends thereof and a corresponding inclined surface 21*c* is also formed at both ends of the connecting part 21, so that the yoke 10 is engaged to the connecting part 21.

A fabrication method of the motor stator assembly according to the present invention will be explained.

As shown in FIG. 14, thin silicon steel within 1 mm is processed by blanking, thereby forming the plurality of yoke plates 11.

At this time, as shown in FIG. 13, the yoke plates 11 are formed by processing the silicon steel having a predetermined length and a width by a punching tool having a plurality of punches at one time.

According to this, time can be considerably reduced than a case when the yoke plates 11 are formed one by one with one punch.

Then, the yoke plates 11 are laminated with a constant height thus to form the yoke 10, and the laminated yoke 10 is installed at each side of the mold thus to form a predetermined frame.

Herein, if the yoke 10 is filled in the mold, a molding space C is formed at another part. Magnetic powder material is filled in the molding space C.

The magnetic powder material is pressed with a predetermined pressure and heated with a predetermined temperature thus to form the pole 20 engaged to the yoke 10. The pole 20 is integrally engaged to the yoke 10 at the time of molding, instead of engaging the pole 20 and the yoke 10 each other after separately fabricating.

Also, in order to fabricate the pole 20, the magnetic powder material is pressed and the pressed magnetic powder material is cured with approximately 300~500° C. thus to combine the magnetic powder material.

Herein, the curing is different from sintering slightly. By the sintering, powder material is pressed and heated with temperature close to a melting point thus to be combined. At this time, since the powder material is combined by heat of high temperature, characteristic of the material can be changed.

On the contrary, by the curing, the powder material is pressed and heated in approximately 300~500° C. thus to be combined. At this time, since the powder material is heated by relatively small heat, characteristic of the material is not changed.

Finally, the mold is removed and then coil 30 is wound on the pole 20 is formed of the magnetic powder material.

When the coil 30 is wound on the pole 20, the insulator 40 can be attached to a part where the pole 20 is contacted with the coil 30, or insulating material is molded and then the coil is wound.

The motor stator assembly according to the present invention has the following advantages.

First, whereas the pole is formed of the magnetic powder material, the yoke is formed of the silicon steel which is low and has more excellent permeability and the core loss characteristics than the magnetic powder material. Accordingly, a performance deterioration of the motor in the same volume can be effectively prevented and thus cost increase by an enlarged motor can be prevented.

Also, since the yoke plates are processed by blanking with a plurality of punches, time and scrap loss amount are reduced and thus manufacturing cost is reduced.

Besides, the groove is formed at the winding part of the pole on which the coil is wound and the edge of the groove is formed with a curved line shape. According to this, another coating protecting device such as a protector is not required. Also, winding radius of the coil can be reduced as a depth of the groove thus to reduce coil amount on the basis of a constant number of times of winding by approximately 35%. And, by reducing amount of the coil protruded outside the pole and an overall length of the entire coil, winding resistance is lowered and thus the motor efficiency is enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stator assembly of a motor comprising:
a plurality of yokes fabricated by laminating a plurality of Si-steel plate sheets having predetermined length;
a plurality of poles coupled between the yokes and fabricated by molding magnetic material using a mold; and
a plurality of bobbin bodies, on which a coil that generates induced magnetism is wound, covering outer portions of the poles,
wherein the bobbin body comprises:
an inner wing attached on an outer portion of the guide portion on the pole;
a body connected to the inner wing and mounted on the neck portion of the pole to be wound by the coil; and
an outer wing protruded toward each side of the body to cover the coil,
wherein the inner wing is formed to be a circular arc shape similar to the guide portion and formed to have a space therein so that the guide portion can be inserted, and
wherein the body comprises a penetrating hole having the same shape as that of the neck portion on inner side thereof so that the neck portion can be inserted therein, and the coil generating induced magnetism is wound a predetermined number of times on outer side thereof.

2. The assembly of claim 1, wherein the pole comprises:
a guide portion having a circular arc shape and gathering magnetic flux;
a neck portion, on which the bobbin body is mounted, connected to a rear surface of the guide portion; and
a connecting portion formed on a rear surface of the neck portion and coupled to the yoke.

3. The assembly of claim 2, wherein the guide portion having an inner surface of a circular arc shape which guides a rotor to gather the magnetic flux onto the rotor.

4. The assembly of claim 2, wherein the neck portion has shorter length and lower height than those of the guide portion so as to be inserted into the bobbin body.

5. The assembly of claim 2, wherein the connecting portion is formed to have a circular arc shape having predetermined height and width, and to have connecting grooves on both sides thereof.

6. The assembly of claim 5, wherein a connecting projection and a connecting groove for coupling the yoke and the connecting portion are formed between the yoke and the connecting portion as high as the height of the yoke and the connecting portion.

7. The assembly of claim 6, wherein the connecting projection is protruded as a square shape to be coupled to the connecting groove of the connecting portion hollowed as a square shape so as not to separate the yoke from the connecting portion.

8. The assembly of claim 6, wherein the connecting projection is formed to be long and has stopping jaws of same shape on both sides thereof to prevent the yoke from being escaped from the connecting portion and to be coupled to stopping grooves of the connecting portion having the shape corresponding to the stopping jaws.

9. The assembly of claim 1, wherein the pole is molded by using iron powder.

10. The assembly of claim 1, wherein the body comprises a winding recess so that the coil can be wound on outer part thereof.

11. The assembly of claim 1, wherein the bobbin body is formed by using insulating material that insulates the coil from the pole.

12. The assembly of claim 11, wherein the insulating material is epoxy.

13. The assembly of claim 1, wherein the yoke is formed by laminating a plurality of yoke plates coupled between two different connection portions and having a predetermined radius of curvature therein as high as the height of connecting portion.

14. The assembly of claim 1, wherein stepped projections of square shape are formed on both ends of the yoke and coupled to stepped projections of square shape formed on both ends of the connecting portion corresponding thereto.

* * * * *